(12) United States Patent
Hansen

(10) Patent No.: US 6,616,716 B2
(45) Date of Patent: Sep. 9, 2003

(54) METHOD OF IMPROVING THE FLOW PROPERTIES OF A CRUDE OIL OR NATURAL GAS LIQUID

(75) Inventor: Jens H. Hansen, Frederiksberg (DK)

(73) Assignee: Maersk Olie & Gas A/S, Copenhagen (DK)

( * ) Notice: Subject to any disclaimer, the term of this patent is extended or adjusted under 35 U.S.C. 154(b) by 0 days.

(21) Appl. No.: 10/093,887

(22) Filed: Mar. 11, 2002

(65) Prior Publication Data

US 2002/0157305 A1 Oct. 31, 2002

Related U.S. Application Data

(63) Continuation of application No. 09/581,392, filed as application No. PCT/DK98/00535 on Dec. 8, 1998, now abandoned.

(30) Foreign Application Priority Data

Dec. 15, 1997 (DK) .............................................. 1455/97

(51) Int. Cl.$^7$ .................................................. C10L 1/18
(52) U.S. Cl. ............................................ 44/393; 44/397
(58) Field of Search ................................... 11/393, 397

(56) References Cited

U.S. PATENT DOCUMENTS 3,729,296 A  *  4/1973  Miller .......................... 44/397

* cited by examiner

*Primary Examiner*—Cephia D. Toomer
(74) *Attorney, Agent, or Firm*—Dykema Gossett PLLC

(57) ABSTRACT

A method of improving the flow properties of a wax-containing crude oil and natural gas liquids containing a natural pour point depressant wherein a synthetic pour point depressant is added to the crude oil or natural gas liquid when at a temperature of not more than 20° C. below the inversion temperature thereof.

14 Claims, 2 Drawing Sheets

METHOD OF IMPROVING THE FLOW PROPERTIES OF A CRUDE OIL OR NATURAL GAS LIQUID

This application is a continuation of application Ser. No. 09/581,392, filed Aug. 17, 2000 now abandoned, which was a U.S. national phase of PCT/DK98/00535, filed Dec. 8, 1998. The priorities of the parent applications and the Danish prioirty application are requested.

BACKGROUND OF THE INVENTION

1. Field of the Invention

The present invention relates to a method of improving the flow properties of a wax containing crude oil or natural gas liquid containing a natural pour point depressant by adding a synthetic pour point depressant.

2. The Prior Art

Typically, crude oils and natural gas liquids contain several types of hydrocarbons, such as paraffins, naphtenes and aromatics. However, the paraffins, which are normally liquid or gaseous at reservoir conditions, have the disadvantage that at lower temperatures they tend to form a solid wax phase. In practice this gives rise to problems, such as formation of a gel with a significant gel strength, e.g., during shut down of wells, pipelines, processing plants, etc. Likewise, problems caused by wax exchangers can occur. Furthermore, the formation of a solid wax phase can lead to an increased viscosity, which means that the crude oil or natural gas liquid may become significantly more difficult to handle.

For the purpose of alleviating the above problems it has been known for long to add so-called "pour point depressants" in order to lower the pour point of the crude oil or natural gas liquid, which point according to ASTM D97 or ASTM D5853 is defined as the temperature at which a crude oil or natural gas liquid at given conditions starts to solidify. Such synthetic pour point depressants may comprise a wide range of polymers and copolymers (polyacetates, polyacrylates, polymethacrylates, polyamides, etc.).

The polymers may roughly be divided into nucleators and growth arrestors depending on their function in the crude oil or natural gas liquid. However, it is a common feature thereof that they are incorporated in the solid wax phase and thereby change its structure and properties. To achieve improved efficiency, it is normal practice to add the former type of wax inhibitor at or close to the wax appearance temperature (WAT) of the crude oil or natural gas liquid, which is defined as the temperature at which the wax starts to precipitate. The latter type of wax inhibitor can be added at lower temperatures, although the efficiency hereof seems to increase if the polymer is incorporated already in the solid wax phase first formed.

In certain crude oils and natural gas liquids there are, however, also naturally occurring pour point depressants for instance in the form of asphaltenes, which are a group of heavy polar aromatic compounds having a molecular weight in the range 700–1000 g/mole. These natural pour point depressants are present in the crude oil or natural gas liquid when it is produced from the reservoir, and are normally fully dispersed in the liquid phase at initial reservoir conditions. At lower temperatures they may, however, start to flocculate, which reduces their pour point depressing efficiency. This phenomenon gives rise to the concepts upper and lower pour points, as defined in the standard ASTM D97. Flocculation of the natural pour point depressants may also be induced by changed pressure or mixing with water or other oils/condensates. Just like synthetic pour point depressants they change the structure of the wax phase formed, although in many cases their mere presence does not completely suffice for solving the problems associated with wax precipitation.

In practice during oil production, an amount of the abovementioned synthetic pour point depressants has therefore been added to crude oils and natural gas liquids at a temperature close to the WAT of the crude oil or natural gas liquid, assuming that thereby an additive effect of the natural and synthetic pour point depressants would be obtained.

In certain cases this additive effect does not appear, as the naturally occurring pour point depressants seem to be capable of counteracting and even totally neutralizing the effect of the synthetic pour point depressants.

Consequently, it is the object of the present invention to provide a method of reducing or eliminating the above problems and thereby ensure an effective improvement of the flow properties of crude oils and natural gas liquids.

SUMMARY OF THE INVENTION

The method according to the present invention is characterized in that the synthetic pour point depressant is added to the crude oil or natural gas liquid at a higher temperature than 20° C. below the inversion temperature of the crude oil or natural gas liquid.

The inversion temperature of a crude oil or natural gas liquid is determined by the use of a modified ASTM D97 or modified ASTM D5853 standard method. These standards specify upper and lower pour points to be measured after reheating the sample to 48° C. and 105° C., respectively. By reheating the crude oil or natural gas liquid to a given temperature and subsequently determining the pour point of this sample and repeating this measurement at different reheating temperatures and subsequently depicting these pour points as a function of the reheating temperature, the reheating temperature at which the pour point has been reduced to its minimum value can be determined. This point is defined as the inversion temperature, and is the temperature at which the natural pour point depressants are fully active. The result will typically be within the interval 80–110° C.

The inversion temperature definition is, however, not applicable to hydrocarbon samples, where the upper and lower pour points are identical. This phenomena is believed to be due to the lack of natural pour point depressants mainly found among the asphaltene fraction of the fluid.

When using the method according to the invention it has turned out that in situations in which addition of synthetic pour point depressants has otherwise been without result, a positive effect can be obtained. This is presumably due to the pour point depressant being added to the crude oil or natural gas liquid at a time when the natural pour point depressants are fully or at least partly dispersed. In this way it is avoided that the flocculated natural pour point depressants, which apparently form a separate, polar liquid phase, are capable of absorbing the synthetic pour point depressants by virtue of their content of polar groups.

Due to a more efficient pour point depression, it is possible to obtain a suitable pour point even by addition of small amounts of synthetic pour point depressants. Alternatively, a lower pour point can be obtained by using the usual amount of synthetic pour point depressant.

Preferably the synthetic pour point depressant should be added at a higher temperature than e.g. 10° C. below the inversion temperature, more preferably at or above the inversion temperature. If the synthetic pour point depressant is added at a temperature 20° C. below the inversion temperature of the crude oil or natural gas liquid, the natural pour point depressants are thus not fully dispersed, which means that the efficiency obtained is not optimal.

In practice, the best effect is obtained by injecting the synthetic pour point depressant into the well bore at a depth, where the crude oil or natural gas liquid has a temperature at or higher than the inversion temperature.

An appropriate depth for adding the synthetic pour point depressant, may be determined as the depth at which the formation temperature corresponds to the inversion temperature of the crude oil or natural gas liquid produced. Since the temperature at this point automatically will increase once the production starts, adding the depressant at this depth ensures that the temperature of the crude oil or natural gas liquid will always exceed the inversion temperature when mixed with the synthetic pour point depressant.

The required dosage of synthetic pour point depressant depends on factors such as the type of crude oil, amount of wax formed in the crude oil at different temperatures, ambient conditions etc. The optimum dose rate is normally estimated by means of laboratory measurements of pour point, viscosity, gel strength and wax deposition tendency. The two latter measurements are often carried out on laboratory coils. In practice the synthetic pour point depressant is added in an amount of 5–2000 ppm, preferably 20–500 ppm and most preferably 20–100 ppm.

A preferred synthetic pour point depressant useful in the method according to the invention comprises a chemical compound having the general formula I:

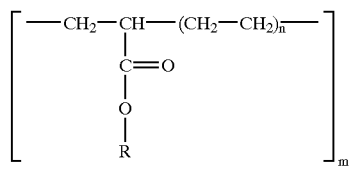

where n=20–300, preferably m=25–100 and most preferably m=50–80, n=5–50, preferably n=5–25 and most preferably n=8–15 and R symbolises a hydrocarbon, preferably an aliphatic hydrocarbon and most preferably an aliphatic hydrocarbon consisting of 2–20 carbon atoms.

However, also other compounds may be used, such as polyacetates, polyacrylates, polymethacrylates, polyamides etc.

The invention is described in more detail in the following examples taken in conjunction with the attached drawings.

EXAMPLE 1

It is the purpose of this experiment to demonstrate a correlation between the temperature of the oil sample at which the synthetic pour point depressant is being added and the efficiency of the synthetic pour point depressant added. In this experiment an oil sample no. 1 having the following characteristics is used:

| | |
|---|---|
| Wax appearance temperature (° C.) | 50 |
| Upper pour point (° C.) | 33 |
| Lower pour point (° C.) | 24–27 |
| Wax content (weight % at −30° C.) | 22 |
| Asphaltene content (weight %) | 0.2 |
| Density (g/cm$^3$) | 0.868 |
| Kinematic viscosity at 80° C. (cSt) | 3.50 |
| Kinematic viscosity at 75° C. (cSt) | 3.91 |
| Kinematic viscosity at 70° C. (cSt) | 4.34 |
| Kinematic viscosity at 65° C. (cSt) | 4.81 |
| Kinematic viscosity at 60° C. (cSt) | 5.36 |
| Kinematic viscosity at 55° C. (cSt) | 6.03 |
| Kinematic viscosity at 50° C. (cSt) | 6.85 |
| Kinematic viscosity at 45° C. (cSt) | 9.31 |
| Kinematic viscosity at 40° C. (cSt) | 14.73 |

The wax appearance temperature of the oil sample was determined from the viscosity measurements.

Figure 1:
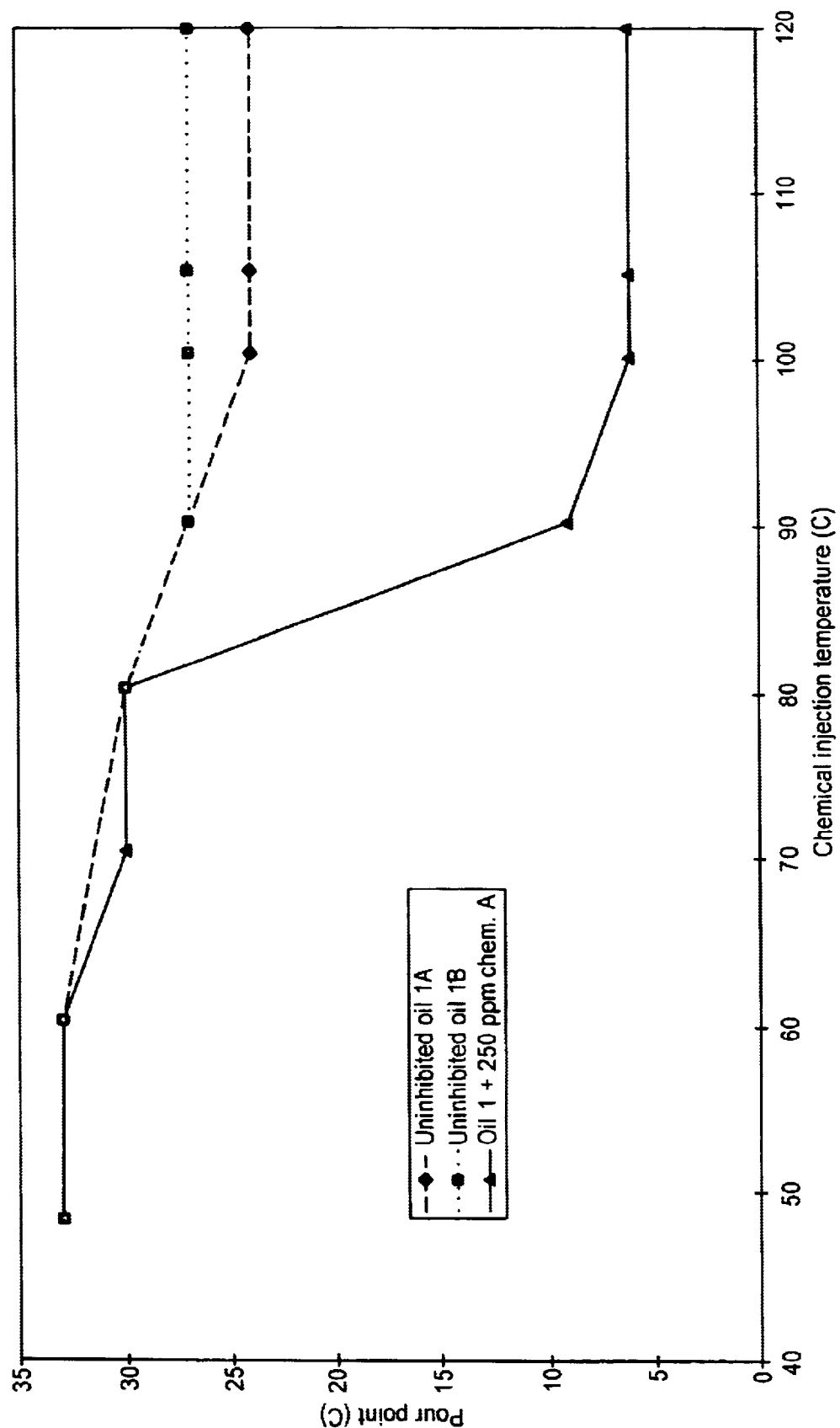
FIG. 1 shows a graph of the pour points of a first oil sample relative to heating temperature used in Example 1.

Measurement of the pour point of oil sample no. 1 was then conducted on two uninhibited subsamples nos. 1A and 1B by heating the oil samples to various temperatures succeeded by cooling in order to determine the pour point of the oil samples. From the results of the measurements, in FIG. 1, showing the pour point as a function of the reheating temperature, it is seen that the inversion temperature of the oil sample may vary from 90 to 100° C.

Then the same oil sample no. 1 was again heated to different temperatures, followed by addition of 250 ppm of the chemical additive A, and the effect hereof was examined by measuring the pour point of the oil sample, by letting it cool down in accordance with standard procedure ASTM D97. The result hereof is also seen from FIG. 1 (250 ppm of chem. A). It appears clearly that the pour point of the oil sample no. 1 with addition of additive A follows the trend of the two uninhibited subsamples up until approx. 80° C., above which point the additive becomes active with a resulting strong decrease in the pour point of the oil sample.

This is consistent with the theory proposed, as the 100° C. corresponds to the inversion temperature of the oil sample no. 1B, which means that the natural pour point depressants here are fully dispersed. Thus FIG. 1 shows that for this very waxy crude oil sample a pour point improvement of the magnitude of 18–21° C. can be observed with chemical dosage of only 250 ppm.

EXAMPLE 2

It is the purpose of this example to demonstrate that in accordance with the proposed theory, it is only in case of crude oil or natural gas liquid samples containing natural pour point depressants that the favourable effect of an increased chemical injection temperature is achieved. In this experiment an oil sample no. 2 having the following characteristics is used:

| | |
|---|---|
| Wax appearance temperature (° C.) | 40 |
| Upper pour point (° C.) | 12 |
| Lower pour point (° C.) | 12 |
| Wax content (weight % at −30° C.) | 10.4 |
| Asphaltene content (weight %) | <0.05* |
| Density (g/cm$^3$) | 0.799 |
| Kinematic viscosity at 70° C. (cSt) | 1.224 |
| Kinematic viscosity at 60° C. (cSt) | 1.394 |
| Kinematic viscosity at 50° C. (cSt) | 1.596 |
| Kinematic viscosity at 40° C. (cSt) | 1.866 |

| | |
|---|---|
| Kinematic viscosity at 30° C. (cSt) | 2.733 |
| Kinematic viscosity at 20° C. (cSt) | 5.4 |

*detection limit

The wax appearance temperature of the oil sample no. 2 was determined from the viscosity measurements.

Figure 2:
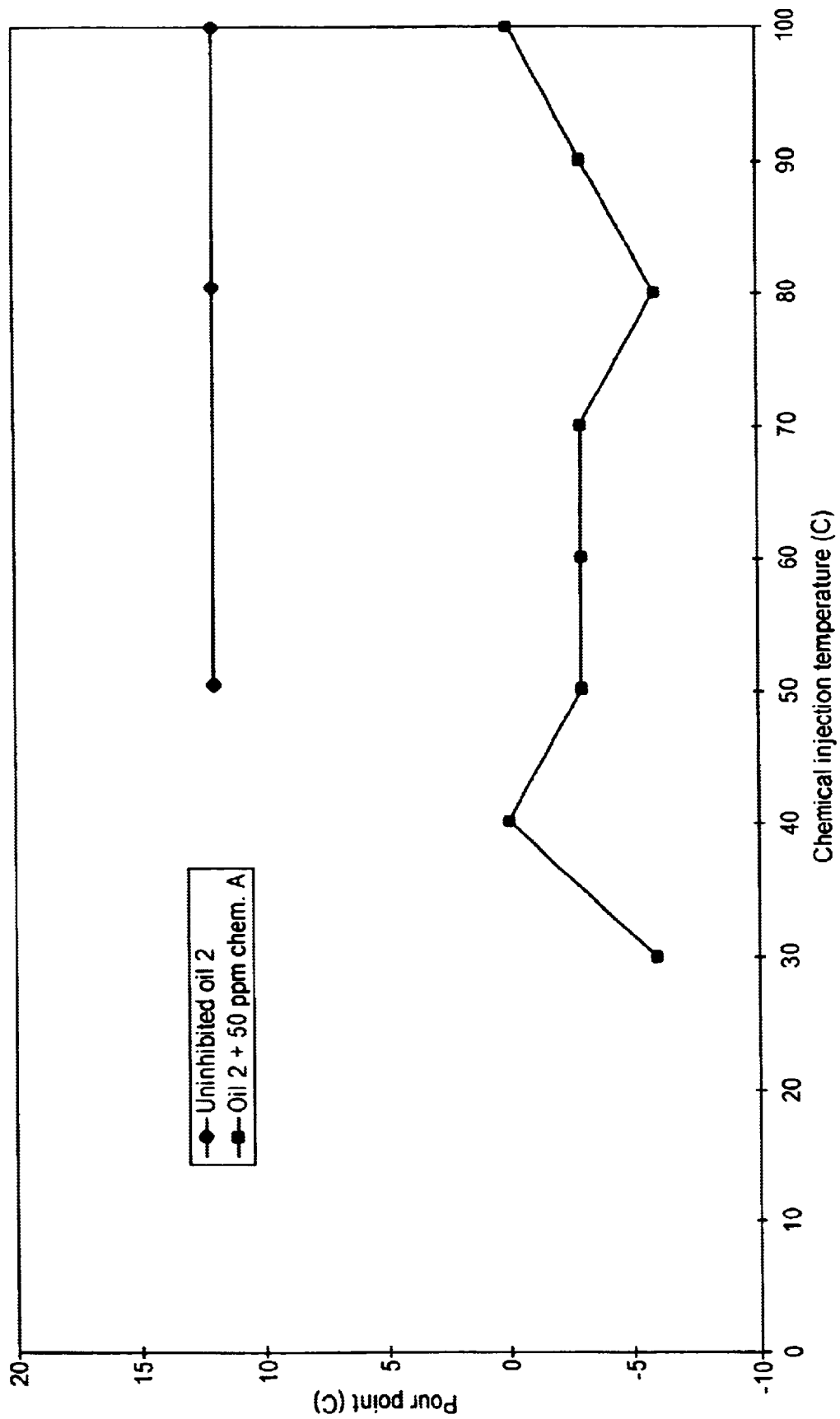
FIG. 2 shows a similar graph for a second oil sample used in Example 2.

Measurements of the pour point of the uninhibited oil sample no. 2 as a function of the heating temperature were conducted, as stated above, and the results appear from FIG. 2. It should be noted that upper and lower pour point are identical, which is strongly indicative of the absence of natural pour point depressants.

Hereafter the pour point was determined again following addition of 50 ppm of chemical additive A in order to test the effect of the addition temperature according to the above example. As is seen from FIG. 2 (50 ppm of chem. A), the temperature has no influence on the efficiency of the additive, which according to the proposed theory is consistent with the missing content of natural pour point depressants.

What is claimed is:

1. A method of improving the flow properties of a wax containing crude oil or natural gas liquid excluding Bahrain pitch containing asphaltenes and other wax-containing crude oils or natural gas liquids displaying nonidentical upper and lower pour points (ASTM D97/D5853) comprising adding a synthetic pour point depressant to the crude oil or natural gas liquid when the crude oil or natural gas liquid is at a temperature higher than 20° C. below the inversion temperature of the crude oil or natural gas liquid.

2. A method according to claim 1, wherein the synthetic pour point depressant is added to the crude oil or natural gas liquid when at a temperature higher than 10° C. below the inversion temperature.

3. A method according to claim 1, wherein the synthetic pour point depressant comprises a substance having the formula I:

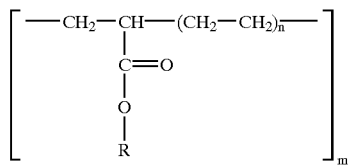

where m=20–300, n=5–50, and R symbolizes a hydrocarbon.

4. A method according to claim 1, wherein the synthetic pour point depressant is added in an amount of 5–2000 ppm.

5. A method according to claim 1, wherein the synthetic pour point depressant is injected into a well bore.

6. A method according to claim 2, wherein the synthetic pour point depressant is added at a temperature at or above the inversion temperature.

7. A method according to claim 3, wherein m=25–100.

8. A method according to claim 7, wherein m=50–80.

9. A method according to claim 3, wherein n=5–25.

10. A method according to claim 9, wherein n=8–15.

11. A method according to claim 3, wherein R is an aliphatic hydrocarbon.

12. A method according to claim 11, wherein said aliphatic hydrocarbon consists of 2–20 carbon atoms.

13. A method according to claim 4, wherein said synthetic pour point depressant is added in an amount of 20–500 ppm.

14. A method according to claim 13, wherein said synthetic pour point depressant is added in an amount of 20–100 ppm.

* * * * *